ELECTRICAL CIRCUIT

Filed March 28, 1962

INVENTOR.
ROBERT H. JENKINS
BY John V. Regan
Attorney

United States Patent Office 3,247,363

Patented Apr. 19, 1966

3,247,363

ELECTRICAL CIRCUIT

Robert H. Jenkins, Audubon, N.J., assignor to Radio Corporation of America, a corporation of Delaware Filed Mar. 28, 1962, Ser. No. 183,279

10 Claims. (Cl. 235—61.11)

This invention relates to resistance discriminating circuits and, in particular, to a circuit which produces a change in output in response to an applied input signal only when the input impedance lies within a predetermined range of values.

Perforated record cards and card handling equipment are used in many information handling systems. Such cards have a number of rows and columns, and information is stored by perforating a card at the intersections of predetermined rows and columns. In one known method of reading the stored information, a card is positioned on an electrically conductive plate or roller. A number of metallic probes, such as brushes, are positioned on the opposite side of the card, and each makes contact with the conductive plate when a perforation is present between the plate and that probe. The plate or roller is strobed by a voltage pulse when the card is in a reading position. Current then flows through those probes which are in contact with the plate. In the ideal case no current flows through a probe which is separated from the plate by a portion of the card, because of the high resistance of the card material. The presence and absence of current flow signifies the presence and absence of a perforation, respectively.

Card reader mechanisms employing probes for sensing often give erroneous indications of perforations when reading "mark sense" cards. In a mark sense card system, a card is first marked with a graphite pencil at desired row and column intersections and then perforated at the marked intersections. Oftentimes the mark is greater in extent than the perforation, and may even extend to the vicinity of an adjacent row and column intersection which is not perforated. In this event, current flows from the conductive plate at the perforation and through the graphite mark to the probe at the adjacent unperforated position, thereby giving an erroneous indication of a perforation beneath the probe. The same problem exists generally in reading any card which has been written upon or marked by a pencil or other conductive substance, whatever the occasion.

It is an object of this invention to provide an improved resistance discriminating circuit.

It is another object of this invention to provide a circuit which gives a change in output in response to an applied input signal only when the input impedance of the circuit lies within a predetermined range of values.

When practiced with graphite-marked punched cards, the invention makes use of the fact that the graphite has a high resistance relative to the probe-to-plate contact resistance, and a low resistance relative to the resistance of the card. Therefore, a circuit which senses the resistance in series with a probe and provides an output only when the resistance lies within a certain range of values, not including the resistance of a graphite mark, may be used to overcome this problem.

The foregoing and other objects are accomplished according to the invention by a bridge-type circuit having two parallel circuit branches. One branch includes two series-connected elements of knwn impedance. The other branch includes a third element of known impedance connected in series with an unknown impedance means. The unknown impedance means in the case of a card reader is the sensing probe and its series resistance. A chargeable energy storage device, such as a capacitor, is connected between the junction of the first and second elements and the junction of the third element and the unknown impedance means. When a voltage pulse is applied across the two branches, the capacitor charges to a value determined by the value of the unknown impedance means. The polarity of the charge depends upon whether this impedance is greater or less than a predetermined value. A unidirectional conducting device is connected between an output load and one of the terminals of the capacitor.

In the accompanying drawing, like reference characters refer to like components, and:

Figures 1, 2, 3:
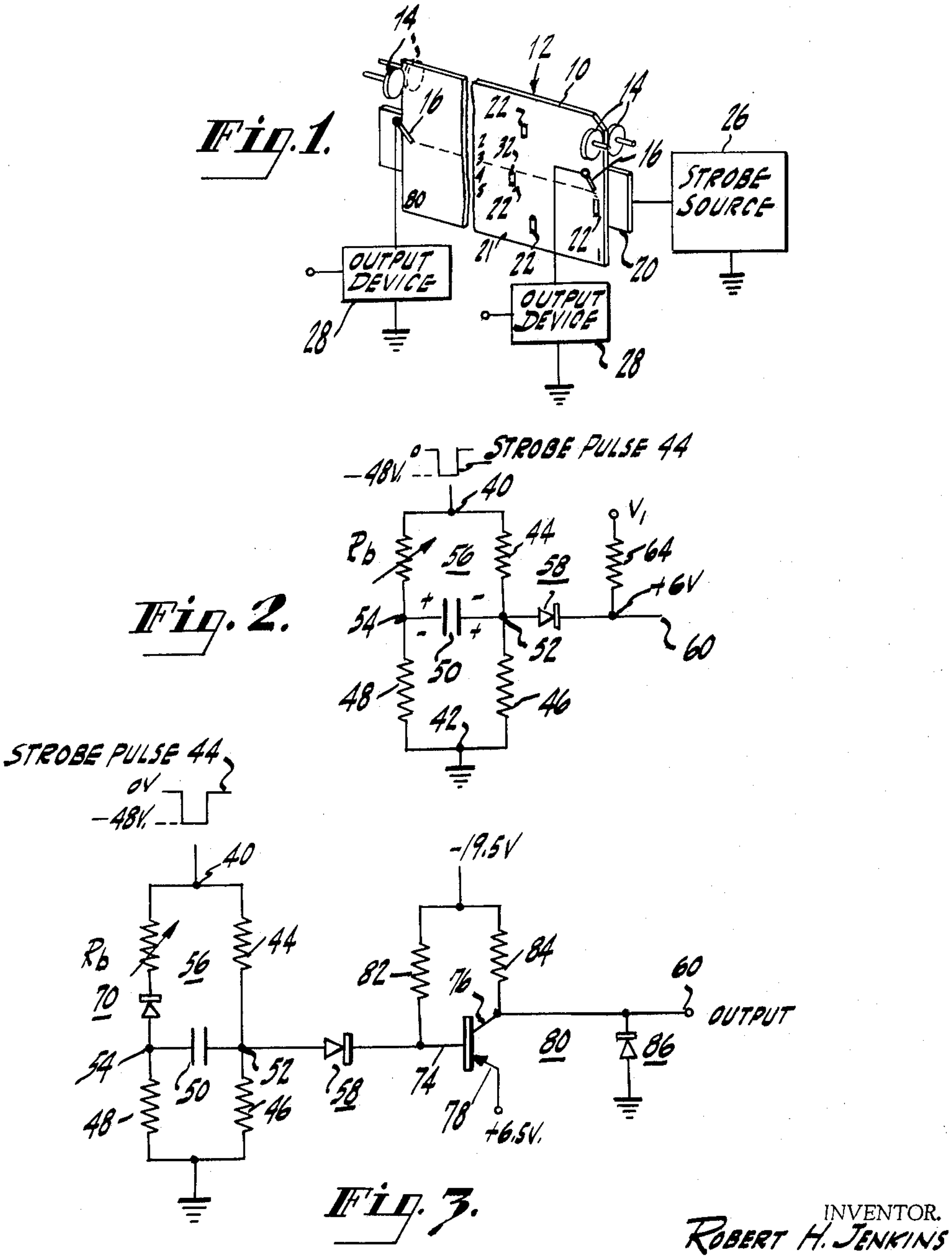
FIGURE 1 is a view, partly in perspective and partly in block form, of a card reader system in which the invention may be employed.
FIGURE 2 is a schematic diagram of one embodiment of the invention.
FIGURE 3 is a schematic diagram of another embodiment of the invention.

The present invention is particularly well suited for use in a perforation sensing system of the type discussed previously, and will be so described hereinafter. It should be understood, however, that the invention has general application in systems wherein it is required to provide an output indication whenever the input impedance lies within a certain range of values.

A card reader system in which the invention may be practiced is illustrated in FIGURE 1. Perforated record cards 10 are advanced in a downward direction, indicated by the arrow 12 by sets of rollers 14. The card 10 may be, for example, one of known type having twelve rows and eighty columns, some of which are numbered in the drawing for purposes of discussion. Eighty conductive sensing brushes 16, one for each column of the card 10, are aligned in a row normal to the direction of card 10 travel. Only two of the brushes 16 are illustrated for clarity of drawing. The cards 10 move past an electrically conductive plate 20 and are in contact therewith at the sensing station. The plate 20 is positioned on the opposite side of the card 10 from the brushes 16. The brushes 16 are urged against the cards 10.

Information is stored in the card by perforating the card at the intersections of certain ones of the rows and columns. The perforations are designated in the drawing by the reference character 22. Whenever a perforation 22 is present between the plate 20 and a brush 16, the brush 16 projects through the card 10 and makes electrical contact with the conductive plate 20. Voltage strobe pulses are applied to the plate 20 from a source 26 at timed intervals synchronized with the card 10 movement. A strobe pulse is applied each time a row of the card 10 is in sensing position. Current flows from the strobe source 26 through the conductive plate 20 and through those brushes 16 in contact with the plate 20 to the output devices 28. The impedance of a brush 16 circuit generally is less than 100 ohms when the brush 16 is in contact with the plate 20 and is infinite, for practical purposes, in the absence of a perforation 22.

In a mark sense card system, desired perforation positions are marked with a graphite pencil and the cards 10 are then perforated at the marked positions. These graphite marks often extend past the desired perforation position, as shown by the mark 32, and may extend to an adjacent row position. In FIGURE 1, the brushes 16 are illustrated as reading the information in row 3 of card 10. The card 10 has a perforation 22 in row 4 of column 20, and no perforation in row 3 of column 21. Accordingly, no current should flow through the brush 16 associated with column 21. However, a current path is completed between this brush (not shown) and the conductive plate 20 by way of the graphite mark 32 and the side wall of the perforation 22 of the previously read row. Accordingly, current flows through the brush when the circuit is energized by the strobe source 26. The impedance of this brush circuit may be as low as eight or nine hundred ohms in the worst case, which is relatively low compared to the infinite resistance which should be present. It is necessary to provide means for distinguishing between the current which flows in the presence of a perforation 20 and the current which flows in the presence of a graphite mark 32 in order that erroneous perforation indications may be prevented.

One embodiment of the present invention for overcoming this problem is illustrated in FIGURE 2. The circuit includes first and second circuit branches connected between a pair of terminal points 40 and 42. The terminal point 40 is connected to receive the strobe pulses 44 from the strobe source 26 (FIGURE 1), and the other terminal point 42 is connected to a point of reference potential, indicated by the standard symbol for circuit ground. The first circuit branch includes a pair of serially-connected elements of known impedance, such as resistors 44, 46. The second circuit branch includes a third resistor 48 of known value and a resistor $R_b$, shown as being variable. The resistor $R_b$ represents the resistance of a brush 16 and the resistance which appears between the brush 16 and the conductive plate 20. A chargeable energy storage device 50, illustrated as a capacitor, is connected between the junction 52 of resistors 44 and 46 and the junction 54 of the resistors 48 and $R_b$. A unidirectional conducting device, illustrated as a diode 58, is connected between the junction point 52 and an output terminal 60. The diode 58 normally is reverse biased from a voltage source designated $V_1$, connected to the diode by a resistor 64. The voltage at the cathode of the diode 58 normally may be, for example, +6 volts.

The value of the resistor $R_b$ may be as high as 150 ohms, for example, when the brush 16 is in contact with the conductive plate 20 and may be as low as 800 ohms when the brush makes contact with a graphite mark 32 extending between the brush and a perforation 22 in an adjacent row. In the absence of a perforation 22 and a mark 32, the resistance of $R_b$ is infinite for practical purposes. It is desired that the diode 58 be reverse biased when a strobe pulse 44 is applied, and remain reverse biased at the termination of the pulse 44 whenever the resistance of $R_b$ is more than a few hundred ohms. In any event, the diode 58 must not conduct when the brush 16 is in contact with a graphite mark 32.

The values of the various resistors 44, 46 and 48 in the bridge 56 are chosen so that the bridge 56 is in balance electrically when the value of $R_b$ is approximately 800 ohms. Also, the value of resistor 48 is chosen to be small relative to the values of the resistors 44 and 46 for purposes which will be apparent as the discussion proceeds. Assume that the resistance of $R_b$ is 800 ohms when the strobe pulse 44 is applied. The voltages at the junctions 52 and 54 then are equal and negative relative to ground, and the diode 58 remains reverse biased. The capacitor 50 does not charge because the bridge 56 is in balance. Consequently, no change in voltage appears at the output terminal 60 when the strobe pulse 44 is applied or after its termination. Since the resistance of $R_b$ never is lower than 800 ohms when a mark 32 is detected, no change in the signal level at the output terminal 60 ever occurs to give a faulty indication when a brush 16 contacts a graphite mark 32.

Assume now that the resistance of $R_b$ is infinite when the strobe pulse 44 is applied. Current, in the conventional sense, flows from ground through resistor 48 to charge the capacitor 50 in the polarity direction indicated at the top of the capacitor. The value of the capacitor 50 is chosen with respect to the various resistance values so that the capacitor 50 charges to about 98 percent during the presence of a strobe pulse 44. The voltage at the junction point 52 is negative relative to ground at that time and the diode 58 is reverse biased. At the termination of the pulse 44, the capacitor 50 discharges through resistor 48 and through resistors 44 and 46. The voltage at the junction point 52 remains negative while the capacitor 50 discharges. Accordingly, the diode 58 remains reverse biased during and after the strobe pulse 44.

Assume now that a perforation is present between the brush 16 and the conductive plate 20. The resistor $R_b$ then has a relatively low value, and the voltage at the junction 54 is more negative than the voltage at the junction 52 when a strobe pulse 44 is applied. The capacitor 50 charges in the polarity direction indicated below the capacitor. The voltage at the junction point 52 remains negative relative to ground while the pulse 44 is present. At the termination of the pulse 44, the capacitor 50 discharges and current, in the conventional sense, flows through the resistors 44 and $R_b$ and through resistors 46 and 48 to the left-hand plate of the capacitor 50. The voltage at the junction point 52 then is positive relative to ground during the discharge of the capacitor 50. The values of the various resistors 44, 46 and 48 are selected so that the voltage at the junction point 52 is more positive than approximately +6.5 volts. The diode 58 then conducts in the forward direction and a change in voltage appears at the output terminal 60.

In summary, the diode 58 always is reverse biased during the strobe pulse 44 regardless of the bridge 56 unbalance. The diode 58 becomes forward biased at the termination of the strobe pulse 44 only when the bridge 56 unbalance is great enough to permit the capacitor 50 to acquire a charge greater than 6 volts in one polarity direction. By way of example, the bridge 56 components may have the following values:

| | | |
|---|---|---|
| Resistor **44** | ohms | 51K |
| Resistor **46** | do | 100K |
| Resistor **48** | do | 1.6K |
| Capacitor **50** | $\mu\mu$farads | 2400 |

The resistors 44 and 46 are chosen to have large resistance values relative to resistor 48. The voltage at the junction 54 then has a value close to zero volts at the termination of the strobe pulse 44 and the voltage charge across capacitor 50 appears almost in its entirety between the junction 52 and ground. For the particular values indicated above, the bridge is in balance when $R_b$ is 816 ohms. When $R_b$ is 100 ohms, indicating the presence of a perforation, the voltages at the junctions 54 and 52 are approximately −45.2 volts and −31.8 volts, respectively, during a strobe pulse 44. Assuming that the strobe pulse 44 has a duration of 500 microseconds, the capacitor 50 charges to approximately 98 percent of the voltage difference between these junctions 52 and 54. The voltage at the junction 54 drops close to ground at the terminaiton of the strobe pulse 44 and the charge across the capacitor 50 raises the voltage at the junction 52 to approximately 13.4 volts positive with respect to ground. A large positive voltage swing appears at the output terminal 60 for this condition.

FIGURE 3 is a schematic diagram of another embodiment of the invention. The bridge 56 differs from that illustrated in FIGURE 2 by addition of a unidirectional conducting device, such as diode 70, connected between the resistor $R_b$ and the junction 54. Card readers often are subject to much stray noise, especially when brushes are employed. It is believed apparent from the drawing that positive noise spikes at brush 16 would be passed by the capacitor 50 to the anode of the diode 58 in the absence of the blocking diode 70. If these spikes are of sufficient magnitude, the diode 58 becomes forward biased and a faulty output condition results. The diode 70 is poled in a direction to block positive noise spikes. Negative noise spikes are ineffective to cause false triggering unless applied for a sufficiently long time to charge the capacitor 50.

The cathode of the diode 58 is connected to the base electrode 74 of a PNP transistor 80, and by way of a resistor 82 to a source of bias of −19.5 volts. The collector electrode 76 is connected to the −19.5 volt source through a resistor 84. A clamp diode 86 is connected between the collector electrode 76 and ground and poled in a direction to clamp the voltage at the collector electrode 76 at approximately ground potential when the transistor 80 is nonconducting. The emitter electrode 78 is connected to a source of bias of +6.5 volts. The base, emitter and collector electrodes in this configuration are control, input and output electrodes, respectively.

Base current for the transistor 80 flows through the resistor 82 in the normal condition. The various circuit components in the transistor 80 circuit are selected so that the transistor 80 normally is saturated. Assuming a forward base-emitter voltage drop of 0.4 volt, the normal voltage at the base electrode 74 is +6.1 volts, and the diode 58 is reverse biased. The bridge 56 circuit operates in the same manner as the FIGURE 2 bridge circuit. The voltage at the junction point 52 never goes positive unless the resistance of $R_b$ is less than 820 ohms. The voltage at the junction 52 must rise to a positive potential of approximately 6.9 volts in order to forward bias the diode 58 sufficiently to cut off the transistor 80 completely. The voltage at the output terminal 60 then drops from approximately +6.5 volts to ground. Since the maximum resistance of $R_b$ is approximately 100 ohms when a perforation is present, the resulting high positive voltage at the junction 52, as determined previously, is more than sufficient to forward bias diode 58 and cut off the transistor 80 when a perforation 22 is present.

It is believed apparent that an NPN transistor may be employed in the FIGURE 3 circuit provided that the polarities of the various bias sources and the strobe pulse 44 are reversed and provided further that the diodes 58, 70 and 86 are connected in the reverse manner. Various other circuit modifications may be made without departing from the spirit of the invention.

The components for one operating circuit according to FIGURE 3 are listed below by way of illustration:

| | | |
|---|---|---|
| Diode **70** | | 1N270 |
| Diode **58** | | 1N270 |
| Diode **86** | | 1N270 |
| Transistor **80** | | 2N404 |
| Resistor **44** | ohms | 51K |
| Resistor **46** | do | 100K |
| Resistor **48** | do | 1.6K |
| Resistor **82** | do | 160K |
| Resistor **84** | do | 8.2K |
| Capacitor **50** | μμfarads | 2400 |

What is claimed is:

1. The combination comprising:
a first circuit branch including first and second series-connected impedances of known, fixed value;
a second circuit branch connected in parallel with said first circuit branch and including a third impedance of known, fixed value connected in series with means of unknown impedance;
chargeable reactance means connected between the junction of said first and second impedances and the junction of said third impedance and said means of unknown impedance;
means for applying an energizing pulse across the circuit branches;
a unidirectional conducting device having one electrode connected to one said junction;
and output means connected to the other electrode of said unidirectional conducting device.

2. The combination comprising:
a first circuit branch including first and second series-connected elements of fixed resistance;
a second circuit branch connected in parallel with said first circuit branch and including a third element of fixed resistance connected in series with means of variable resistance;
chargeable reactance means connected between the junction of said first and second elements and the junction of said third element and said variable resistance means;
means for applying an energizing pulse across the circuit branches;
a unidirectional conducting device having one electrode connected to one said junction;
and output means connected to the other electrode of of said unidirectional conducting device.

3. The combination comprising:
a first circuit branch including first and second series-connected elements of fixed resistance;
a second circuit branch connected in parallel with said first circuit branch and including a third element of fixed resistance connected in series with means of variable resistance;
capacitor means connected between the junction of said first and second elements and the junction of said third element and said variable resistance means;
means for applying an energizing pulse across the circuit branches;
a unidirectional conducting device having one electrode connected to one said junction;
and output means connected to the other electrode of of said unidirectional conducting device.

4. The combination comprising:
a first circuit branch including first and second series-connected elements of fixed resistance;
a second circuit branch connected in parallel with said first circuit branch and including a third element of fixed resistance connected in series with means of variable resistance;
capacitor means connected between the junction of said first and second elements and the junction of said third element and said variable resistance means;
means for applying an energizing pulse across the circuit branches;
a unidirectional conducting device having one electrode connected to one said junction and being poled to block said energizing pulse;
and output means connected to the other electrode of of said unidirectional conducting device.

5. The combination comprising:
a first circuit branch including first and second series-connected impedances of known, fixed impedance value;
a second circuit branch connected in parallel with said first circuit branch and including a third impedance of known, fixed impedance value connected in series with variable impedance means;
a changeable reactance device connected between the junction of said first and second impedances and the junction of said third impedance and said variable impedance means;
means for applying an energizing pulse across the circuit branches;
a unidirectional conducting device having one electrode connected to one said junction;
means for reverse biasing said unidirectional conducting device;
and output means connected to the other electrode of said unidirectional conducting device.

6. The combination comprising:
a first circuit branch including first and second series-connected impedances of fixed value;
a second circuit branch connected in parallel with said first circuit branch and including a third impedance of fixed value connected in series with variable impedance means;
capacitor means connected between the junction of said first and second impedances and the junction of said third impedance and said variable impedance means;

means for applying an energizing pulse across the circuit branches;

a unidirectional conducting device having one electrode connected to one said junction;

means for reverse biasing said unidirectional conducting device;

and output means connected to the other electrode of said unidirectional conducting device.

7. The combination comprising:

a first circuit branch including first and second series-connected elements of fixed resistance;

a second circuit branch connected in parallel with said first circuit branch and including a third element of fixed resistance connected in series with means of variable resistance;

capacitor means connected between the junction of said first and second elements and the junction of said third element and said variable resistance means;

means for applying an energizing pulse across the circuit branches;

a transistor having input, output and control electrodes;

means connected between said input and control electrodes for normally biasing said transistor in a conducting condition;

a unidirectional conducting device connected between one said junction and the control electrode and poled in a direction to pass signals having a polarity to reduce conduction in said transistor;

and output means connected to the output electrode of said transistor.

8. The combination comprising:

a first circuit branch including first and second series-connected resistors of fixed value;

a second circuit branch connected in parallel with said first circuit branch and including a third resistor of fixed value connected in series with variable resistance means;

chargeable reactance means connected between the junction of said first and second resistors and the junction of said third resistor and said variable resistance means;

means for applying an energizing pulse across the parallel circuit branches;

a transistor having input, output and control electrodes;

a unidirectional conducting device connected between one said junction and said control electrode and being poled in a direction to block said energizing pulse;

means for applying a bias voltage between said control and input electrodes;

and output means connected to the output electrode of said transistor.

9. In a system for sensing perforations in a record member, said system including means for positioning said record member against an electrically conductive member, means for applying a strobe pulse to said conductive member, and a conductive sensing device adapted to project through a perforation in said record member to contact said conductive member, the combination comprising:

a first resistor connected between said conductive sensing device and a point of reference potential;

a pair of resistors connected in series between said conductive member and said point of reference potential;

capacitor means connected between the junction of said pair of resistors and the junction of said first resistor and said conductive sensing device;

a unidirectional conducting device having one electrode connected to one said junction;

and output means connected to the other electrode of said unidirectional conducting device.

10. In a system for sensing perforations in a record member, said system including means for advancing said record member past an electrically conductive member, means for applying a strobe pulse to said conductive member, and a conductive sensing device adapted to project through a perforation in said record member to contact said conductive member, the combination comprising:

a first resistor connected between said conductive sensing device and a point of reference potential;

a pair of resistors connected in series between said conductive member and said point of reference potential;

capacitor means connected between the junction of said pair of resistors and the junction of said first resistor and said conductive sensing device;

an amplifying element having input, output and control electrodes;

a unidirectional conducting device connected between one said junction and said control electrode;

means for applying a bias between said input and control electrodes;

and output means connected to the output electrode of said amplifying element.

References Cited by the Examiner

UNITED STATES PATENTS

| | | | |
|---|---|---|---|
| 2,992,339 | 7/1961 | Meyers | 307—88.5 |
| 3,091,704 | 5/1963 | Bashor | 307—88.5 |

ROBERT C. BAILEY, *Primary Examiner.*

MALCOLM A. MORRISON, *Examiner.*